(12) United States Patent
Meyer

(10) Patent No.: US 10,064,344 B1
(45) Date of Patent: Sep. 4, 2018

(54) MODULAR PLANTING SYSTEM

(71) Applicant: Scott R. Meyer, Wallkill, NY (US)

(72) Inventor: Scott R. Meyer, Wallkill, NY (US)

( * ) Notice: Subject to any disclaimer, the term of this patent is extended or adjusted under 35 U.S.C. 154(b) by 282 days.

(21) Appl. No.: 14/837,467

(22) Filed: Aug. 27, 2015

(51) Int. Cl.
*A01G 9/02* (2018.01)
*A01G 9/24* (2006.01)
*A01G 9/20* (2006.01)
*A01G 13/02* (2006.01)

(52) U.S. Cl.
CPC .............. *A01G 9/02* (2013.01); *A01G 9/027* (2013.01); *A01G 9/20* (2013.01); *A01G 9/247* (2013.01); *A01G 13/0206* (2013.01)

(58) Field of Classification Search
CPC .......... A01G 9/02; A01G 9/102; A01G 9/104; A01G 9/20; A01G 9/028; A01G 2009/003
USPC ................................................... 47/21.1, 30
See application file for complete search history.

(56) References Cited

U.S. PATENT DOCUMENTS

| | | | | |
|---|---|---|---|---|
| 2,463,719 | A * | 3/1949 | Schackett | A01G 9/028 47/18 |
| 4,083,147 | A | 4/1978 | Garrick | |
| 4,803,806 | A * | 2/1989 | Ito | A01G 9/00 248/27.8 |
| 5,044,120 | A * | 9/1991 | Couch | A01G 9/02 47/73 |
| 6,199,319 | B1 * | 3/2001 | Skinner | A01G 9/02 40/645 |
| 6,223,466 | B1 * | 5/2001 | Billings | A01G 9/02 47/75 |
| 8,322,087 | B1 | 12/2012 | Lascano | |
| 8,904,706 | B1 | 12/2014 | Smith | |
| 2004/0098912 | A1 * | 5/2004 | Searle | A01G 9/02 47/65.5 |
| 2009/0056215 | A1 * | 3/2009 | Yang | A01G 9/028 47/66.1 |
| 2010/0218422 | A1 * | 9/2010 | Eckert | A01G 9/028 47/65.6 |
| 2011/0203175 | A1 | 8/2011 | Horito et al. | |
| 2013/0025196 | A1 | 1/2013 | Decker et al. | |
| 2013/0133255 | A1 * | 5/2013 | Wu | A01G 9/02 47/66.1 |
| 2013/0212940 | A1 | 8/2013 | Blyden | |
| 2014/0041297 | A1 * | 2/2014 | Miel | A01G 9/028 47/66.6 |
| 2014/0283448 | A1 | 9/2014 | Harris | |

(Continued)

FOREIGN PATENT DOCUMENTS

CA 2691483 A1 3/2011

*Primary Examiner* — Monica L Williams
(74) *Attorney, Agent, or Firm* — Law Offices of Ira D. Blecker, P.C.

(57) ABSTRACT

A modular planting system which includes: an outer planter box having at least one side and being completely open at a top and open at a bottom of the outer planter box; an inner planter box having at least one side and a porous bottom and being completely open at a top of the inner planter box, the inner planter box being sized to fit within the outer planter box such that when the inner planter box is inserted within the outer planter box, a top edge of the at least one side of the inner planter box is at least at a same height as a top edge of the at least one side of the outer planter box; wherein the outer planter box and inner planter box comprise a first module of the modular planting system.

18 Claims, 12 Drawing Sheets

(56) References Cited

U.S. PATENT DOCUMENTS

2015/0027046 A1* 1/2015 Adolf ............... A01G 9/02
  47/65.5
2015/0201563 A1* 7/2015 Chiang ............. A01G 9/028
  47/86

* cited by examiner

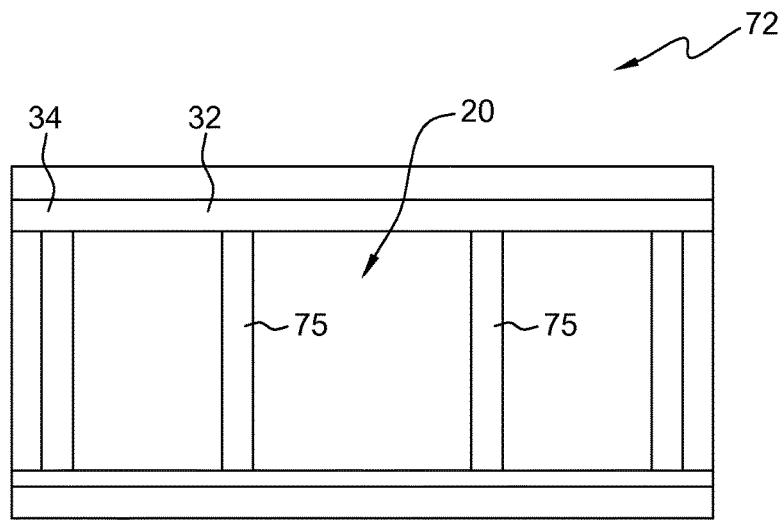
FIG. 6D
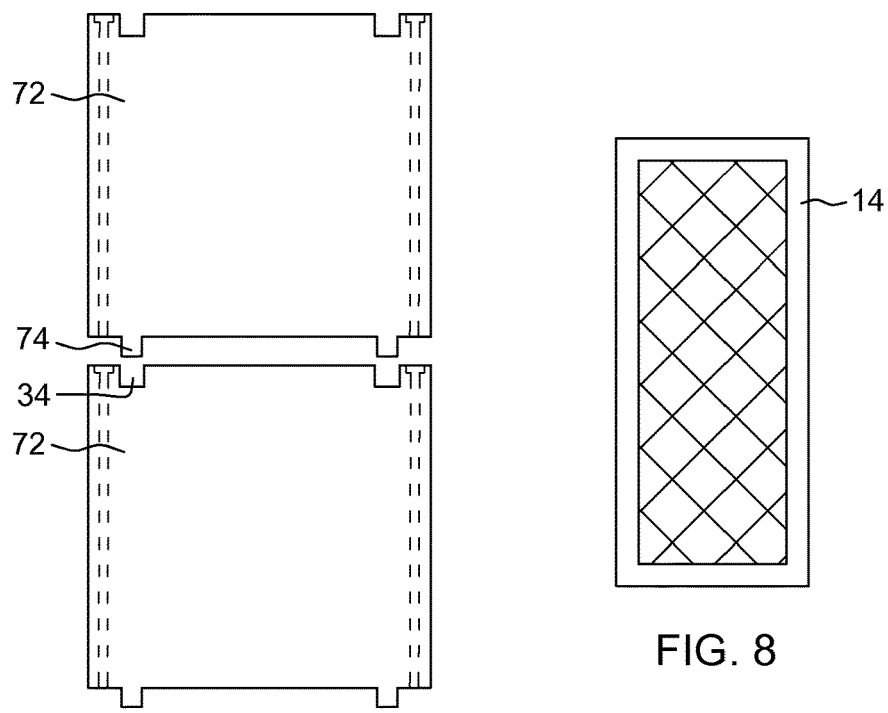
FIG. 7
FIG. 8

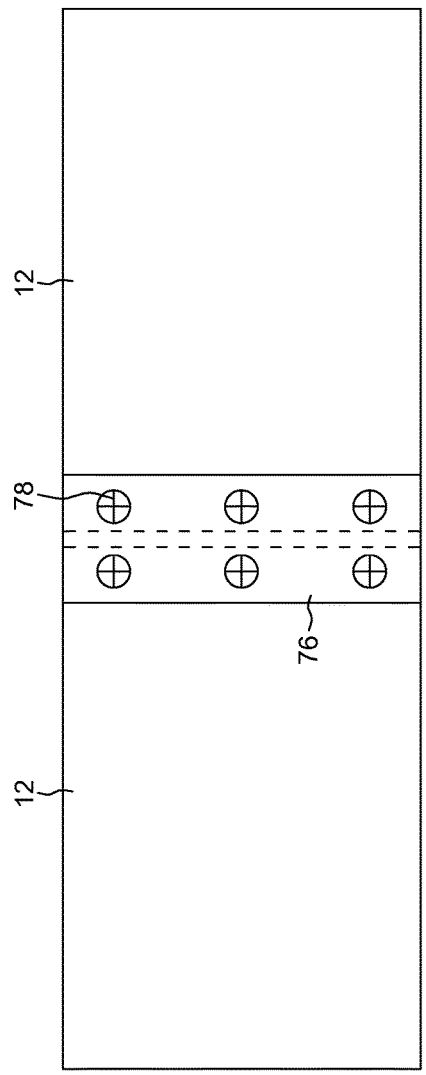
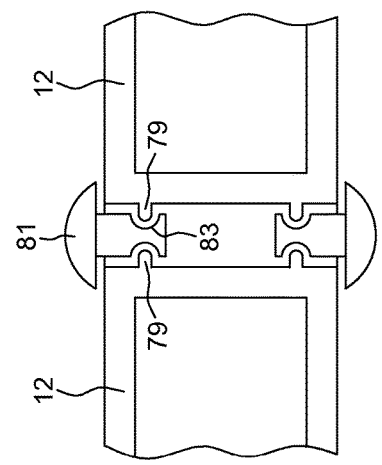

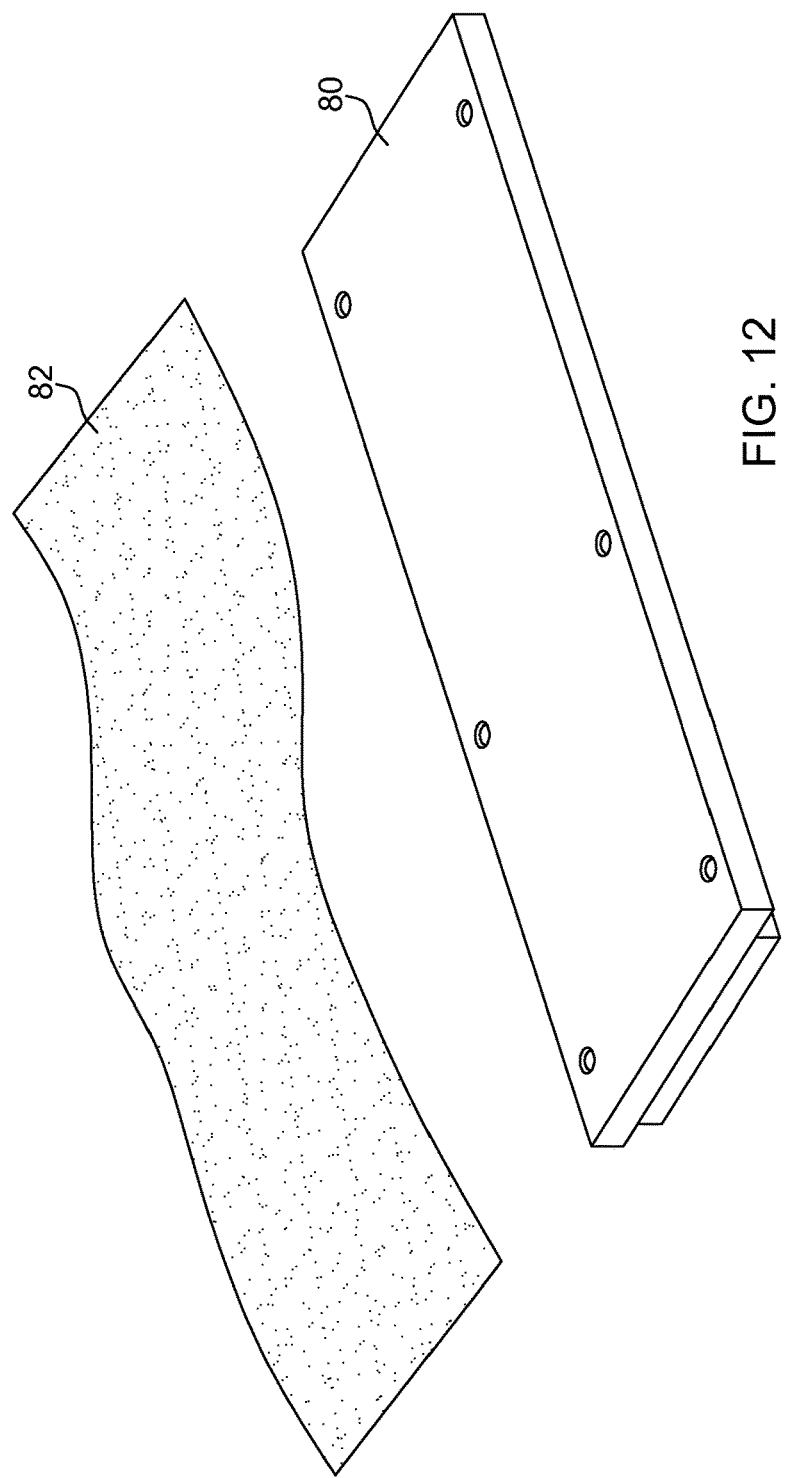

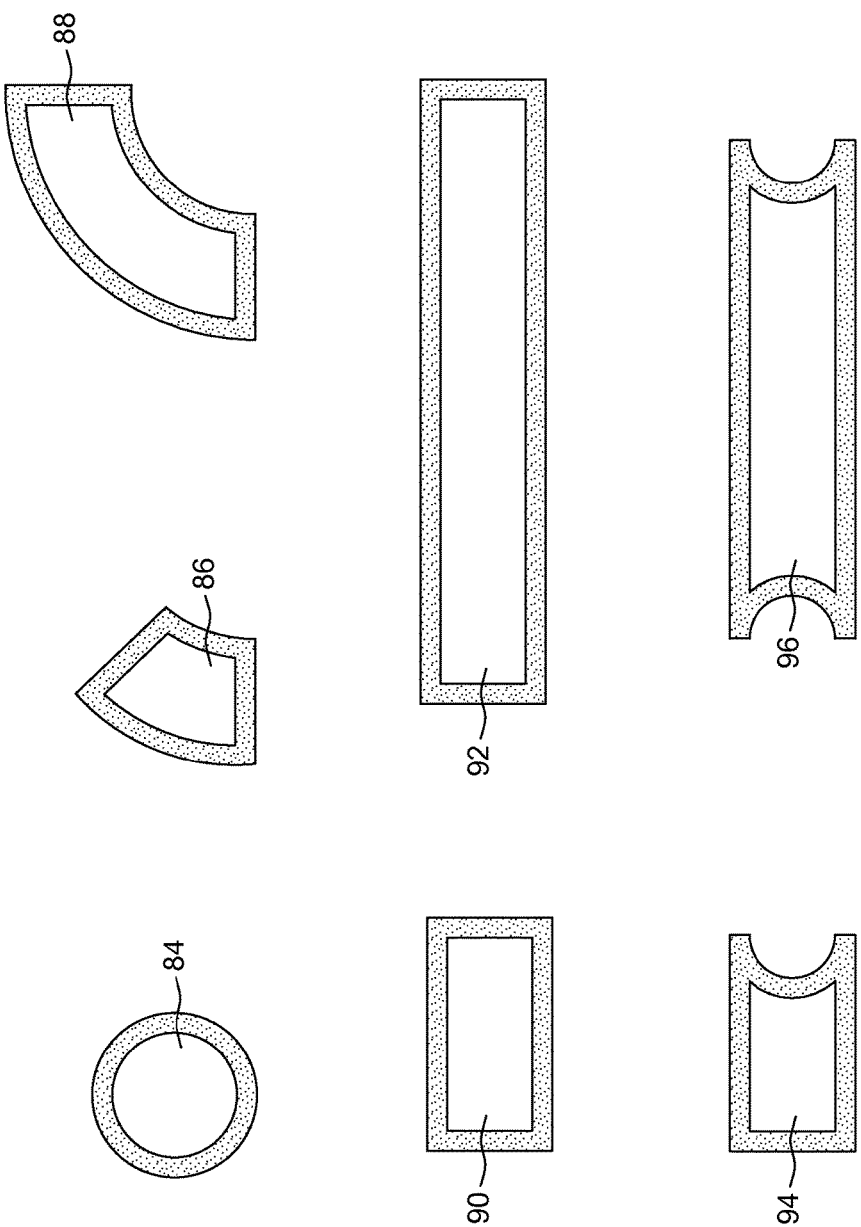

MODULAR PLANTING SYSTEM

BACKGROUND

The present invention relates to a modular planting system which makes landscaping of all shapes and sizes much easier for anyone using the modular planting system.

Landscaping, particularly planting of flower gardens, is often tedious and physically demanding. One may be discouraged from doing landscaping because of a lack of time to do the landscaping as it may require a considerable amount of time to prepare the soil and plant a variety of flowers, for example. Too, landscaping often requires kneeling down for long periods of time to do the considerable amount of work necessary for landscaping. As one ages, it may be difficult for one to do the work necessary for landscaping.

Then there is the weather. After taking the time to do the landscaping, a spate of cold weather may adversely affect the landscape plantings. If care is not taken, the cold weather may seriously harm or even kill the plantings.

There is presently no way to do landscaping in a less tedious and less physically demanding way while also protecting the new landscape plantings from the adverse weather effects.

BRIEF SUMMARY

The various advantages and purposes of the exemplary embodiments as described above and hereafter are achieved by providing, according to a first aspect of the exemplary embodiments, a modular planting system which includes: an outer planter box having at least one side and being completely open at a top and open at a bottom of the outer planter box; and an inner planter box having at least one side and a porous bottom and being completely open at a top of the inner planter box, the inner planter box being sized to fit within the outer planter box such that when the inner planter box is inserted within the outer planter box, a top edge of the at least one side of the inner planter box is at least at a same height as a top edge of the at least one side of the outer planter box; wherein the outer planter box and inner planter box comprise a first module of the modular planting system.

According to a second aspect of the exemplary embodiments, there is provided a modular planting system which includes: an outer planter box having at least one side and being completely open at a top and open at a bottom of the outer planter box; an inner planter box having at least one side and a porous bottom and being completely open at a top of the inner planter box, the inner planter box being sized to fit within the outer planter box such that when the inner planter box is inserted within the outer planter box, a top edge of the at least one side of the inner planter box is at least at a same height as a top edge of the at least one side of the outer planter box; and a lock top to fit on the top edge of the outer planter box and extending a full length of the top edge, the lock top having an opening to permit the inner planter box to pass through it, the top edge of the outer planter box having a groove to receive at least part of the lock top and position the lock top in place with respect to the outer planter box; wherein the outer planter box, inner planter box and locktop comprise a first module of the modular planting system.

BRIEF DESCRIPTION OF SEVERAL VIEWS OF THE DRAWINGS

The features of the exemplary embodiments believed to be novel and the elements characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

FIG. 6D is a plan view of the outer planter box of FIG. 6D.

FIG. 7 is an illustration of the stacking of a plurality of the outer planter boxes of FIG. 6A to form a retaining wall.

FIG. 8 is a bottom view of the inner planter box of FIG. 1.

FIG. 10A is a side view of two outer planter boxes joined together by a first embodiment of a coupling and FIG. 10B is a top view of the first embodiment of the coupling.

FIG. 11 is a plan view of a second embodiment of a coupling joining two outer planter boxes together.

FIG. 12 is an illustration of an exemplary embodiment of a cover for the outer planter box.

FIG. 13 are illustrations of various exemplary shapes for the modular planting system.

DETAILED DESCRIPTION

Figure 1:
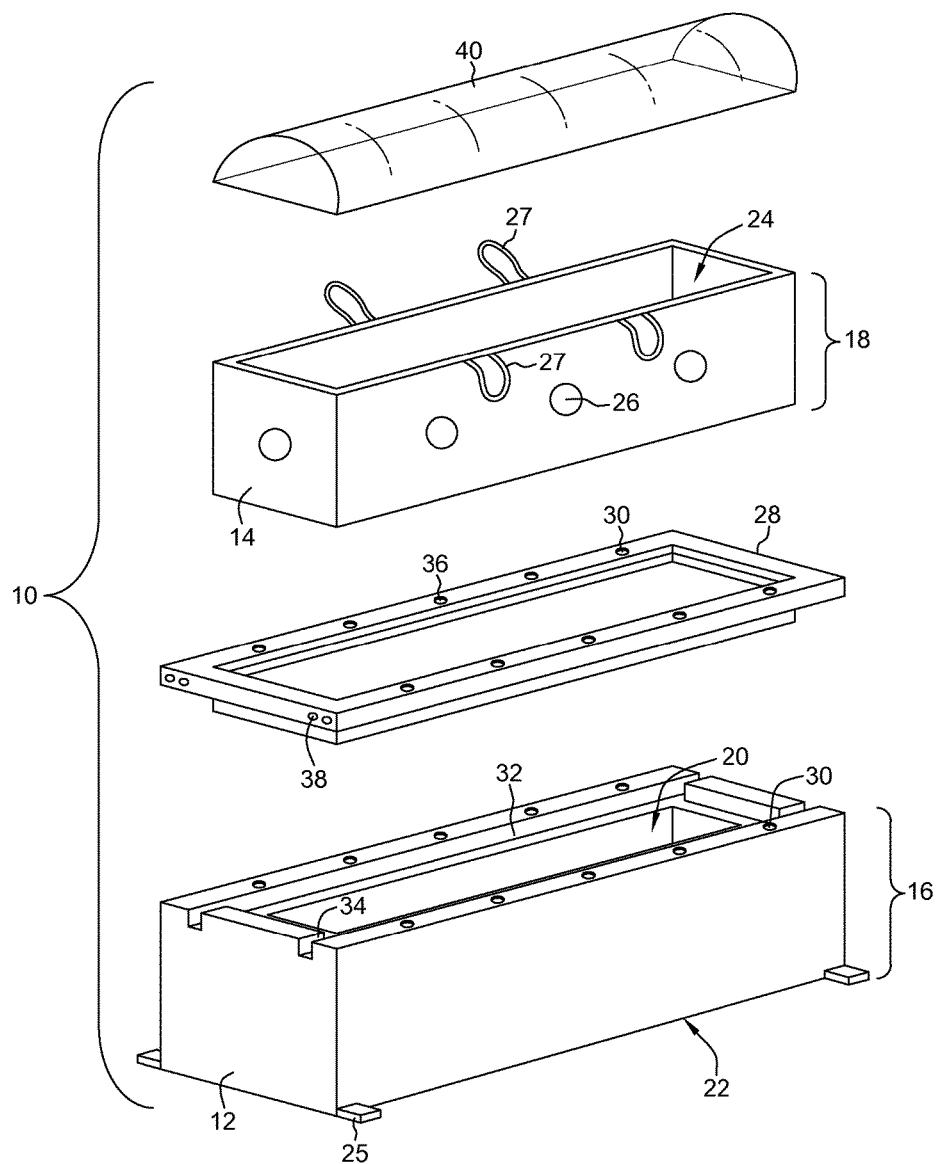
FIG. 1 is an exploded view of an exemplary embodiment of the modular planting system.

According to the exemplary embodiments, there is proposed a very easy and time-saving planting system that can be done year after year with ease and less demanding physical activity.

There are several exemplary embodiments of the modular planting system. These exemplary embodiments include, but are not limited to, a drop-in system, a border system and a retaining wall system.

The drop-in system will be described first. In this exemplary embodiment of the modular planting system, there is an outer planter box that may be planted in the ground and a separate inner planter box that may be prepared out of the ground such as in a garage, planting shed, greenhouse or other area before dropping into the outer planter box. Further, gardeners may typically use a weed barrier, such as a landscaping cloth, underneath the plantings to control weed growth. The outer planter box may have a design such that the landscaping cloth may be locked in place before the inner planter box is dropped into place. The outer planter box may also have apertures or grooves for accepting a lighting system or irrigation system. The apertures may also be suitable for receiving stakes to secure the outer planter box in place in the ground.

The outer planter box and inner planter box may be fabricated in a number of shapes and sizes such as rectangle, cylinder, curved semi-circle, L-shaped just to name a few. Since the inner planter box is dropped into the outer planter box, the inner planter box and outer planter box should have the same shape although the inner planter box will be slightly smaller to allow the inner planter box to be dropped into the outer planter box.

The modular planting system is very versatile in that the inner planter box may be swapped out with another similar inner planter box to allow variability in landscaping design as well allowing some plantings to have more sun than other plantings. Further, the inner planter box may be filled with non-native soil so as to grow certain plantings where the plantings might not otherwise grow, such as in the desert. Also, as the modular planting system is self-contained, water usage may be less.

The inner planter box may additionally have a clear dome cover which may serve several purposes. The dome cover allows plantings for the inner planter box to be started early when the weather is still premature for outside planting. Moreover, when the inner planter box has received plantings and then placed in the outer planter box, the dome cover may be placed over the inner planter box when an unexpected frost may occur. If the frost is expected to last a few days, the inner planter box may be removed from the outer planter box and placed in a more protected environment.

In sum, the inner planter box may be conveniently filled with plantings in a less physically demanding environment. The inner planter box may be made of less durable materials than the outer planter box since the inner planter box may be easily replaced. It is preferred that the outer planter box be made of more durable materials since it is expected that the outer planter box may be in the ground for several seasons before it may need to be replaced.

Another exemplary embodiment of the modular planting system is its use as a border. Most, maybe all, of the currently available border products are strips of plastic or metal. Because of the low profile of these products, it is often difficult to separate the grass area from the planted area which may have mulch or stone. The three dimensional design of the modular planting system allows greater separation of the grass area from the mulched or stoned area and, further, allows the backfilling of the modular planting system with a variety of materials to create an attractive border.

Another exemplary embodiment of the modular planting system is its use as a retaining wall. Most retaining walls used around gardens are made from very heavy materials such as concrete or bulky pressure treated wood. The outer planter box of the exemplary embodiments may be placed into the ground and then stacked up with a locking design built into the outer planter box. The outer planter boxes then can be backfilled with sand or dirt. The top row of outer planter boxes may then receive the inner planter boxes with the plantings.

Referring now to the Figures in more detail, and particularly referring to FIG. 1, there is an exploded view of the modular planting system 10 of the exemplary embodiments. The modular planting system 10 may include an outer planter box 12 and an inner planter box 14 sized to slide within the outer planter box 12. The outer planter box 12 and the inner planter box 14 may have the same vertical height. That is, side 16 of outer planter box 12 should be about the same dimension as side 18 of inner planter box 14.

The outer planter box 12 is open at the top 20 and bottom 22. In one exemplary embodiment, the outer planter 12 may be inserted in the ground (not shown) and be open at the top 20 to receive the inner planter box 14. The outer planter box 12 need not have a bottom since an advantage of the exemplary embodiments is that inner planter box 14, when inserted into the outer planter box 12, may engage with the ground just as if the inner planter box 12 alone was inserted in the ground. However, in one exemplary embodiment, the outer planter box 12 may be partially closed off on the bottom 22 to provide, for example, support and rigidity to the outer planter box 12. In this later exemplary embodiment, the bottom 22 of the outer planter box 12 should be at least 50 to 75% open to provide sufficient contact between the underlying soil and the plantings of the inner planter box 14.

The outer planter box 12 may have a plurality of apertures 30 for securing a lighting system (not shown) or an irrigation system (not shown). Some of the apertures 30 may also be used for staking the outer planter box 12 to the ground. The outer planter box 12 may additionally have grooves 32 for receiving a locktop 28 (to be described hereafter). In a further exemplary embodiment, grooves 34 may be used for stacking of the outer planter box 12 to another outer planter box 12 (not shown) to form a retaining wall as described hereafter. If the outer planter box 12 will not be stacked, then grooves 34 may be dispensed, leaving only grooves 32 for the locktop 28.

The inner planter box 14 has an open top to receive garden soil and plantings (not shown) and a porous bottom (shown in FIG. 8) so that the plantings (not shown) within the inner planter box 14 may easily drain into the ground. The porous bottom may be a screening or perforated material to keep the garden soil in but allow roots of the plantings and water to pass through the screening or perforated material. The inner planter box 14 may also have drain holes 26 for drainage of the soil and plantings (not shown).

Further shown in FIG. 1 is a locktop 28 for securing a landscape material or weed barrier (collectively referred to as a landscape material) to the outer planter box 12. The locktop 28 may additionally have apertures 36 for receiving a lighting system (not shown) or an irrigation system (not shown). In the exemplary embodiment of the locktop 28 shown in FIG. 1, the locktop 28 may also have the same apertures 30 as in the outer planter box 12. The apertures 30 of the locktop 28 preferably should line up with the apertures 30 in the outer planter box 12. The locktop 28 may further have conduits 38 for receiving electrical wires to connect to the lighting system or for providing a fluid such as water to the irrigation system.

The modular planting system may additionally have a dome cover 40 for placing over the inner planting box 14. The dome cover may be useful during the early planting season to act like a little greenhouse to promote the growth of early plantings and also protect the young plants from an unexpected frost.

Figure 9A:
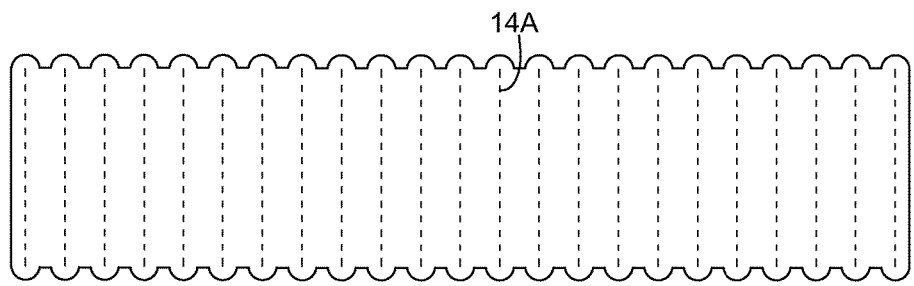
FIG. 9A is another exemplary embodiment of the inner planter box where the inner planter box has been made of a flexible material and FIG. 9B illustrates the inner planter box of FIG. 9A wherein the inner planter box has been flexed to form a curved inner planter box.
Figure 9B:
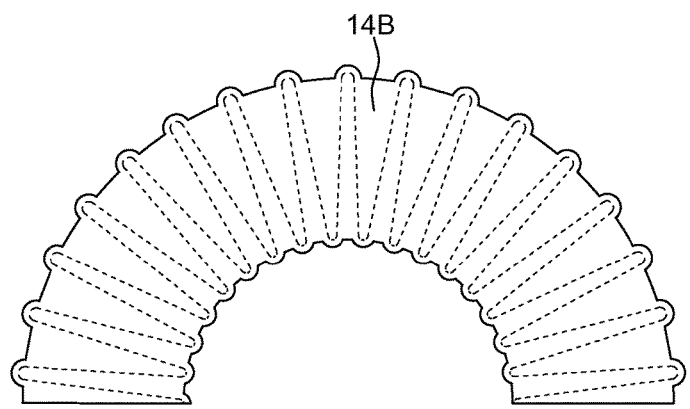

The components of the modular planting system 10 are preferably made from durable but inexpensive materials such as plastics and fiberglass. Since the outer planter box 12 and locktop 28 are meant to be used for several planting seasons, the outer planter box 12 and locktop 28 may be made from more durable materials, or thicker materials, than the inner planter box 14 which may be used for only one or two planting seasons. In one exemplary embodiment, shown in FIG. 9A, the inner planter box 14A may be made from a cardboard or biodegradable material which may be used only one planting season and then discarded at the end of the planting season. In another exemplary embodiment, shown in FIG. 9B, the inner planter box 14B may be made from a flexible cardboard or biodegradable container that may fit any of the different embodiments of the inner planter box 14. The inner planter box 14B may also be discarded at the end of the planting season. The dome cover 40 may be made of any durable clear material such as a plastic to enable use of the dome cover 40 for several planting seasons.

The inner planter box 14 may additionally have handles 27 to assist the removal of the inner planter box 14 from the outer planter box 12. These handles 27 may be in the form of flexible material such as that shown in FIG. 1. Other embodiments of the handles 27 may include tabs (not shown) which may be retractable within the inner planter box 14.

Figure 2:
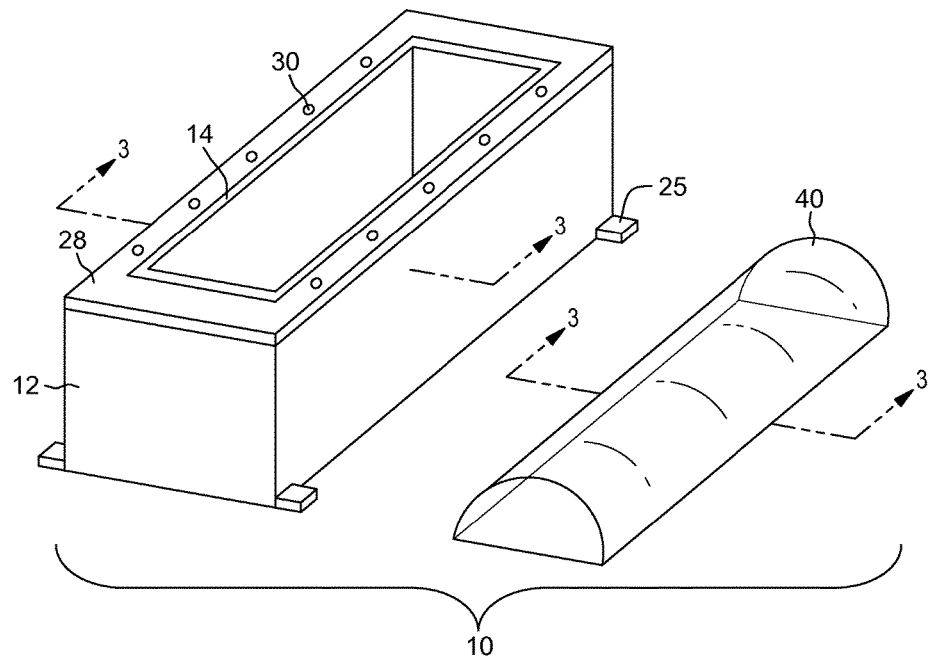
FIG. 2 is a view of an exemplary embodiment of the module planting system assembled except for the dome cover.

Referring now to FIG. 2, the modular planting 10 has been assembled (except for the dome cover 40) by inserting the inner planter box 14 into the outer planter box 12 and then placing the locktop 28 in place. The landscape material is not visible in FIG. 2. The dome cover 40 is nearby in case it needs to be placed in position at a later time.

Figure 3A:
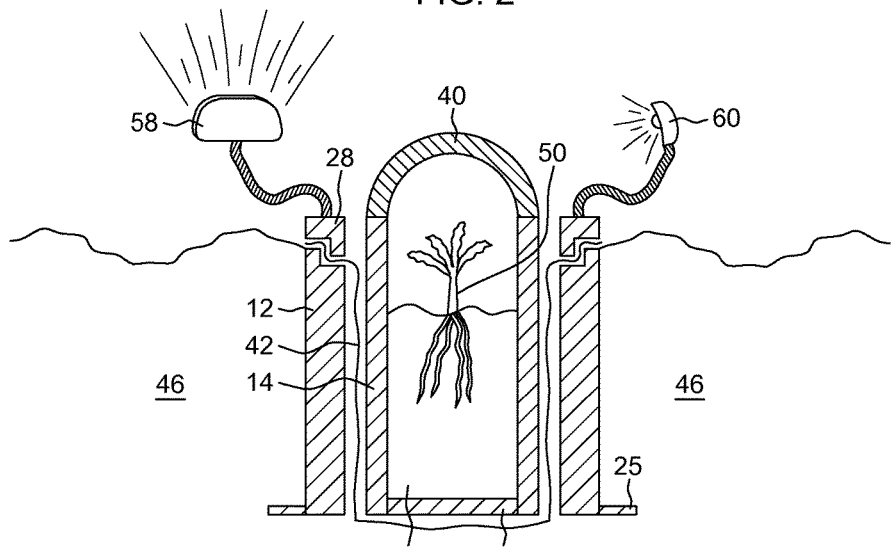
FIG. 3A is a cross section view of the modular planting system of FIG. 2 in the direction of arrow 3-3.

A cross sectional view of the modular planting system 10 is shown in FIG. 3. The cross sectional view has been taken in the direction of arrows 3-3 in FIG. 2. Outer planter box 12 has been inserted in the ground 46. Landscape material 42 has been placed within the outer planter box 12 so as to line the sides of the outer planter box 12 and lay along the ground 46 underneath the inner planter box 14. The landscape material 42 may be held in place by locktop 28. Inner planter box 14 having a porous bottom 44, garden soil 48 and plantings 50 may be placed on the landscape material 42 and in outer planter box 12. If desired, dome cover 40 may be placed on the top of the inner planter box 12. The inner planter box 14, even after being placed within the outer planter box 12, may be easily removed from the outer planter box 12 and placed in another outer planter box 12 or just removed from the other planter box 12 to manage the plantings 50 in the inner planter box 14. While the outer planter box 12 is meant to stay within the ground 46, it too may be removed if desired by removing any staking that may have been applied. Also shown in FIG. 3A are lighting systems 58, 60 which may be attached to the locktop 28.

FIG. 3A shows an additional feature which is not shown in FIG. 2. The outer planter box 12 may include anchor tabs 25 which may be useful to hold the outer planter box 12 in the ground while removing the inner planter box 14. Anchor tabs 25 are also shown on the outer planter 12 in FIG. 1. When anchor tabs 25 are present, staking of the outer planter box 12 may not be necessary.

Figure 3B:
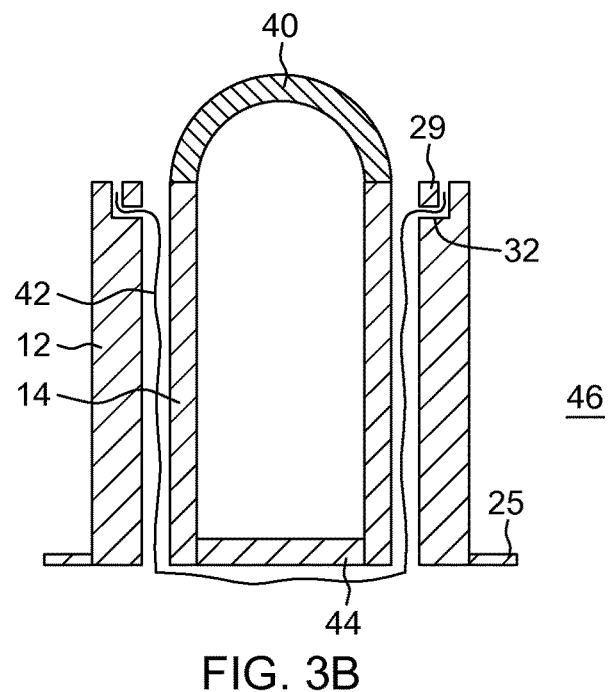
FIG. 3B is a view similar to FIG. 3A with a first modification to the modular planting system of FIG. 2.

Referring now to FIG. 3B, there is shown another exemplary embodiment of a locktop 29. The locktop 29 may sit entirely within the grooves 32 of the outer planter box 12 and be approximately flush with a top of the outer planter box 12. The locktop 29 would perform the same function of holding the landscape material 42 in place.

Figure 3C:
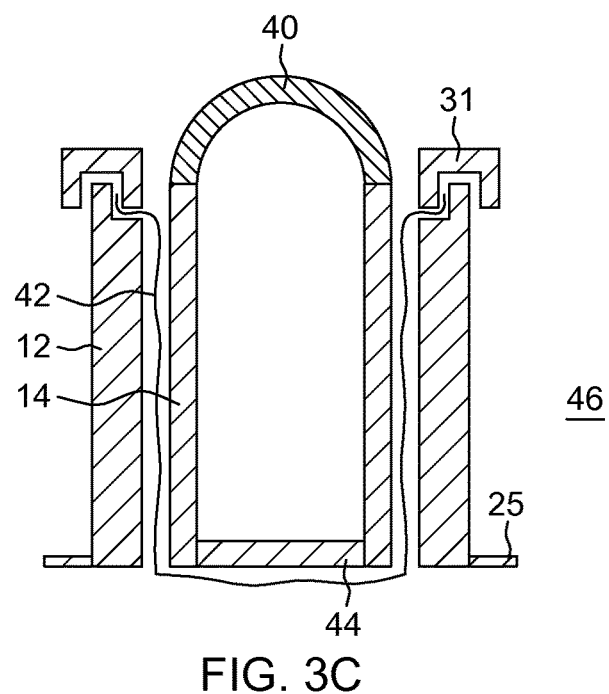
FIG. 3C is a view similar to FIG. 3A with a second modification to the modular planting system of FIG. 2.

Referring now to FIG. 3C, there is shown a further exemplary embodiment of a locktop 31. The locktop 31 may be "U"-shaped so as to sit on the top of the outer planter box 12, with one leg of the "U" being in the grooves 32 of the outer planter box 12. The locktop 31 would perform the same function of holding the landscape material 42 in place.

Figure 4:
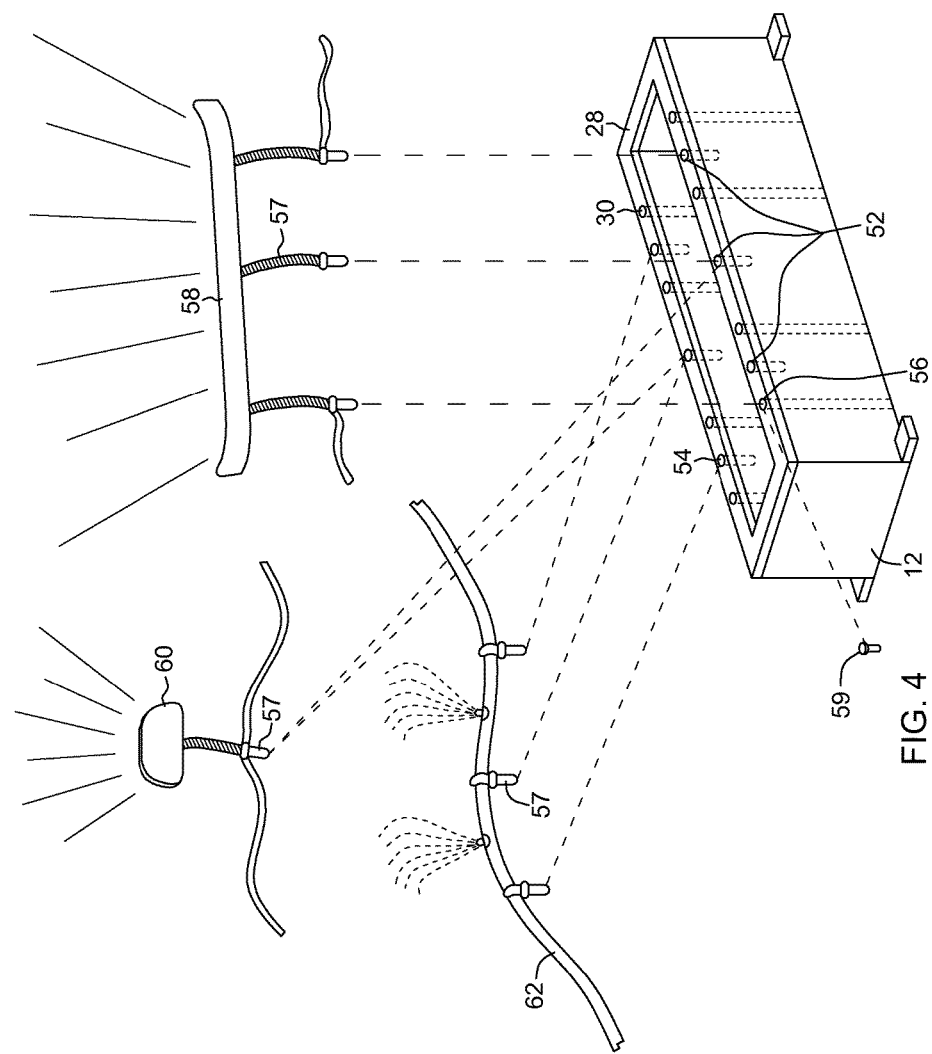
FIG. 4 is an illustration of an exemplary embodiment of the modular planting system having lighting and irrigation accessory components.

Referring now to FIG. 4, there is illustrated the outer planter box 12 having the locktop 28. Also illustrated are accessories that may be utilized with the outer planter box 12 and locktop 28. These accessories may include lighting system 58, lighting system 60 and irrigation system 62. Each of these accessories may be attached to the outer planter box 12 and locktop 28 through apertures 30 which may extend through the locktop 28 into the outer planter box 12. Some of these apertures 52 may be suitable for receiving projections 57 on lighting system 58 or lighting system 60. Others of the apertures 54 may be suitable for receiving projections 57 on irrigation system 62. Preferably, projections 57 may be the same, although not necessarily so, for all of the lighting systems 58, 60 and irrigation system 62 to enable the lighting systems 58, 60 and irrigation system 62 to be placed on either side of the outer planter box 12 and locktop 28. The outer planter box 12 and locktop 28 may further include apertures 56 that penetrate through the entire side of the outer planter box 56 to enable staking of the outer planter box 12 to the ground. While apertures 56 are best for staking the outer planter box 12 and shallow apertures 52, 54 are best for receiving the lighting systems 58, 60 and irrigation system 62, the lighting systems 58, 60 and irrigation system 62 may also use the staking apertures 56 if not being used for staking. The modular planting system may further include one or more caps 59 for plugging the apertures that are not being used.

Figure 5:
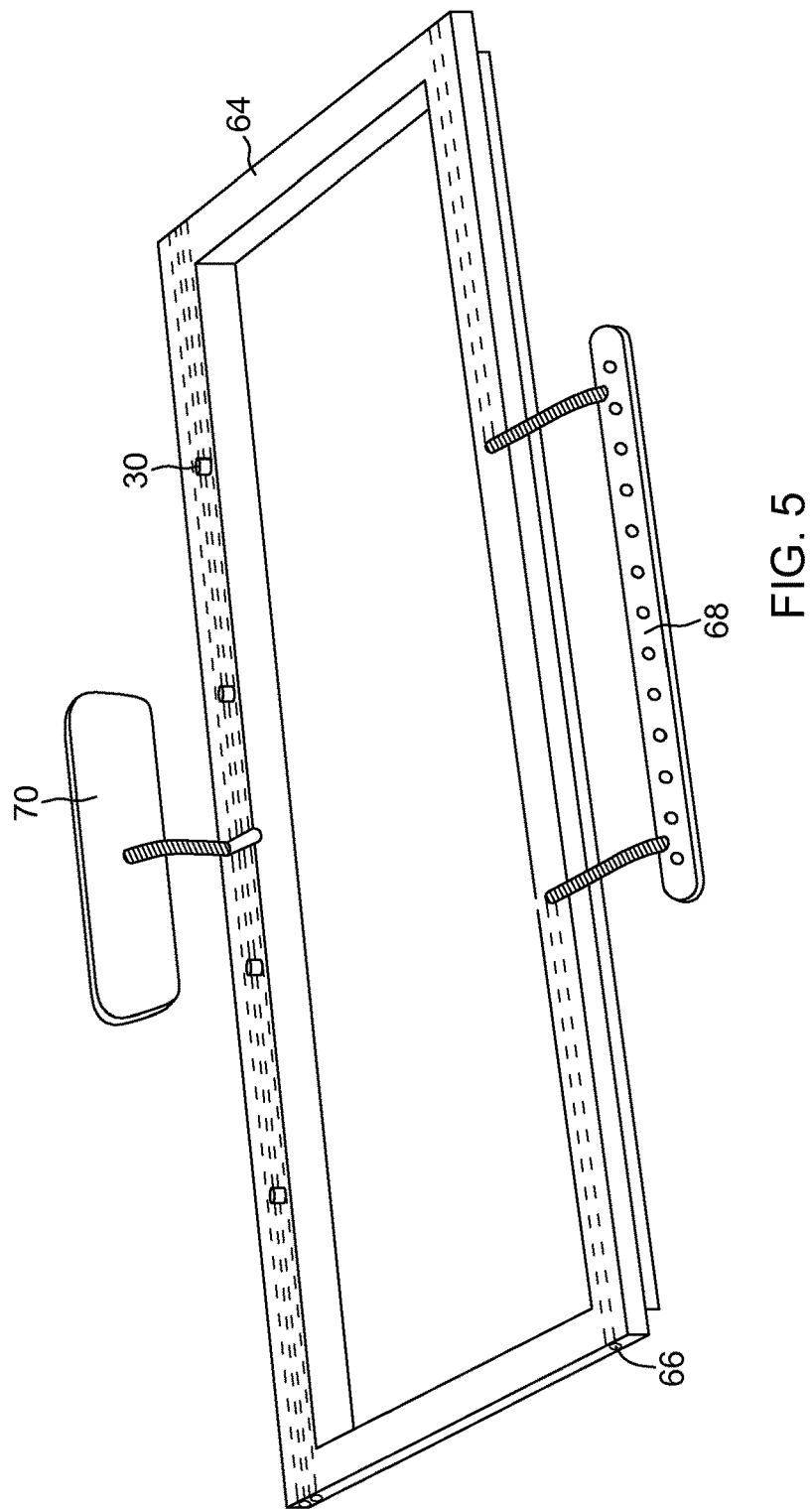
FIG. 5 is another exemplary embodiment of the locktop for the modular planting system.

A modified locktop 64 is illustrated in FIG. 5. Whereas lighting systems 58, 60 in FIG. 4 had wiring external to the outer planter box 12 and locktop 28, lighting systems 68, 70 in FIG. 5 may plug directly into the modified locktop 64 which contains wiring conduits 66. Apertures 30 not used for the lighting systems 68, 70 may receive the projections 57 for the irrigation system 62. Preferably, the lighting systems 68, 70 would be on one side of the locktop 64 while the irrigation system 62 would be on the other side of the locktop 64. Locktop 31 shown in FIG. 3C may be modified similarly to locktop 64 to receive the lighting systems 68, 70.

As noted previously, the outer planter boxes may be stacked to form a retaining wall. It is preferred that the outer planter boxes 72 in FIG. 6A be used when stacking of the outer planter boxes is desired. The outer planter boxes 72 may contain rails 74 on the bottom off the outer planter box 72 which may join with grooves 34 on the top of the outer planter boxes 72. An example of stacking outer planter boxes 72 is illustrated in FIG. 7. Grooves 34 may be a continuation of groves 32 which may receive a locktop 28, for example. The top of the outer planter box 72 has an opening 20 for receiving fill material, such as gravel or soil, or an inner planter box 14 as described previously. When the outer planter boxes 72 are stacked as shown in FIG. 7, a locktop may only be necessary in the topmost stacked outer planter box 72.

Figure 6A:
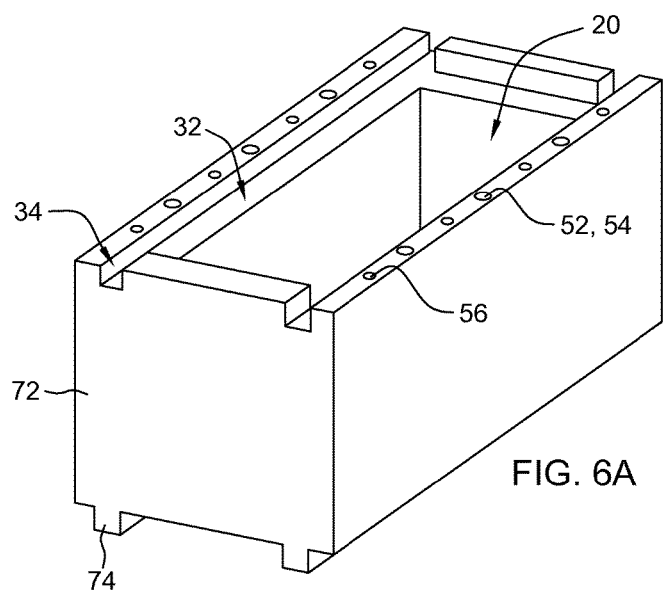
FIG. 6A is a perspective view of another exemplary embodiment of the outer planter box.
Figure 6B:
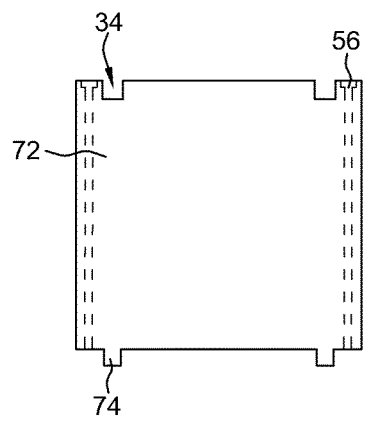
FIG. 6B is an end view of the outer planter box of FIG. 6A.
Figure 6C:
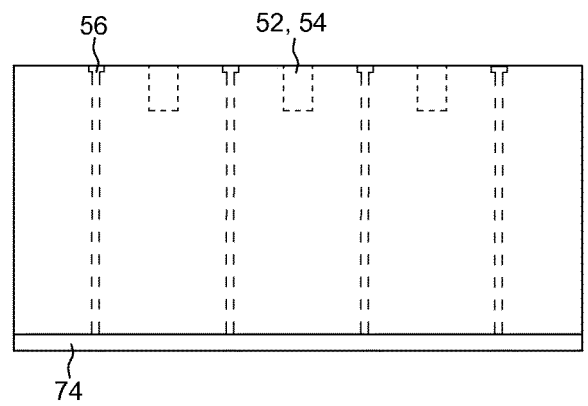
FIG. 6C is a side view of the outer planter box of FIG. 6A

FIG. 6B is an end view and FIG. 6C is a side view of the outer planter box 72. While the rails 74 may continue across the entire length of the outer planter box 72 as shown in FIG. 6C, this is preferred for the greatest stability of the retaining wall although it is within the scope of the present exemplary embodiments for the rails 74 to extend only part way across the length of the outer planter box 72. Outer planter box 72 may contain apertures 56 for staking the outer planter box 72 to another outer planter box.

When the retaining wall has been completed with the stacking of the outer planter boxes 72, the top row of outer planter boxes 72 may receive an inner planter box 14 so that plantings may be used to decorate the retaining wall. Too, shallow apertures 52, 54 may be used for lighting systems or an irrigation system as described previously.

FIG. 6D is a plan view of outer planter box 72. As noted earlier, the bottom of the outer planter boxes such as outer planter box 12 in FIG. 1 and outer planter box 72 in FIGS. 6A-D is open. In one exemplary embodiment, the bottom may be 100% open. However, it may be advantageous to have ribs or supports 75 on the bottom of the outer planter boxes 12, 72 for support and rigidity. Such ribs or supports 75 may be particularly advantageous when the outer planter boxes 72 are used as a retaining wall. It is expected that when the outer planter boxes 12, 72 may have ribs or supports 75, the bottom of the outer planter boxes 12, 72 should still be at least 50 to 75% open.

Various means may be employed to connect the outer planter boxes, such as outer planter boxes 12. Referring now to FIG. 10A, two outer planter boxes 12 have been joined together by coupling 76. Coupling 76 has been attached to outer planter boxes 12 by fasteners 78. A top view of coupling 76 is shown in FIG. 10B. It is noted that coupling 76 is curved which when attached to the outer planter boxes 12 provides the greatest stability to the connection of the outer planter boxes 12.

FIG. 11 illustrates an alternative exemplary embodiment of a coupling 81. FIG. 11 illustrates a plan view of two outer planter boxes 12. Each of the outer planter boxes 12 may have projections 79 which match recesses 83 in the coupling 81. The coupling 81 may extend the entire height of the outer planter boxes 12 such as coupling 76 in FIG. 10A. The projections 79 may extend all or part way of the height of the outer planter boxes so that there is a robust connection between the projections 79 and coupling 81. To connect two outer planter boxes 12, coupling 81 may be slid down so that the recesses 83 of the coupling 81 receive the projections 79 of the outer planter boxes 12.

Referring now to FIG. 12, there is shown a flat cover 80 that may be inserted over the outer planter box 12, for example, when the growing season is over. Mulch 82 or other material may be placed over the flat cover 80 to hide the flat cover 80. The mulch 82 may be removed before the next growing season to expose the flat cover 80 and remove it to allow fresh plantings in an inner planter box 14, to be inserted in the outer planter box 12, for example. If desired, the inner planter box 14 may remain in place when the flat cover 80 is used after the growing season.

Figure 14:
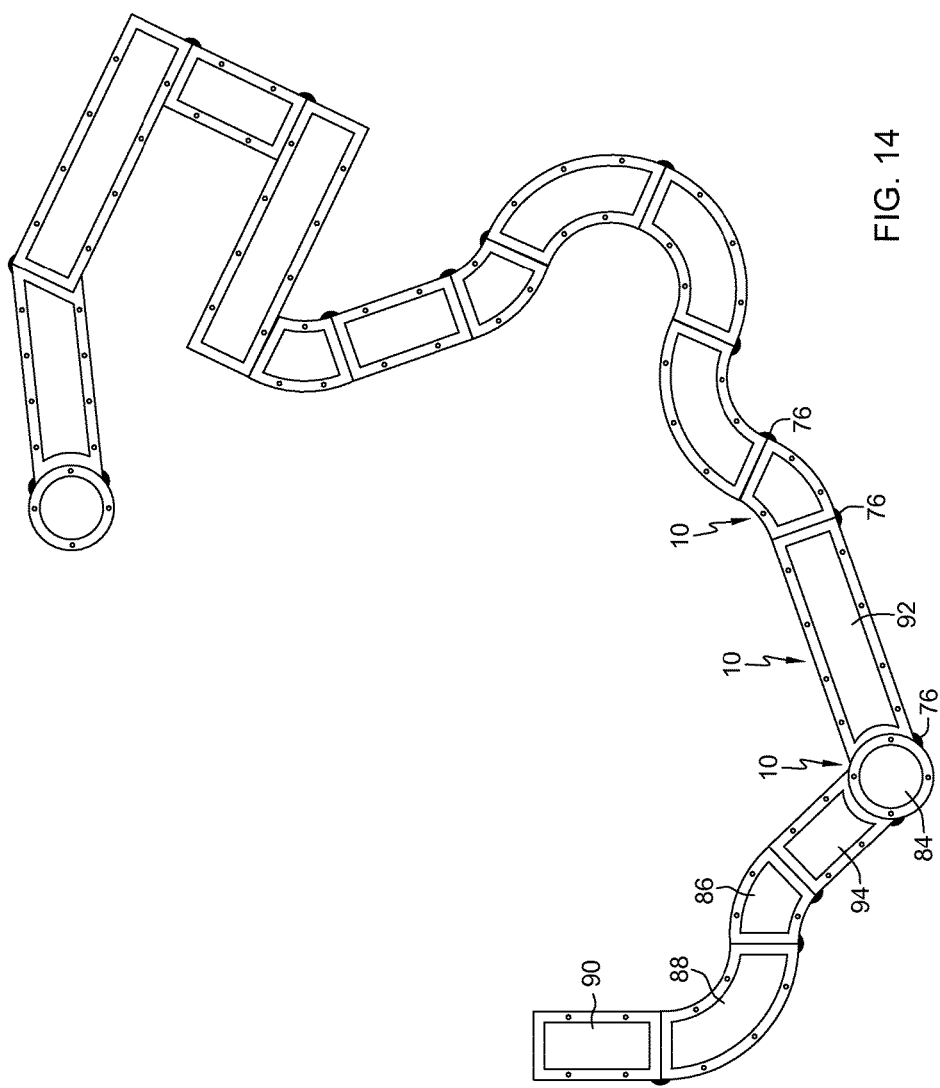
FIG. 14 is an example of a landscaping layout using the exemplary embodiments of the modular planting system.

The modular planting system 10 may come in a variety of different configurations to suit any landscaping design. Referring now to FIG. 13, these configurations may include, but not be limited to, a circle design 84, a small partial circle 86, a large partial circle 88, a small rectangle 90, a large rectangle 92, a half-round catcher 94 and a double-round catcher 96. Some of these configurations are shown in FIG. 14 where a complicated landscaping design has been made using the exemplary embodiments of the modular planting system 10.

It will be apparent to those skilled in the art having regard to this disclosure that other modifications of the exemplary embodiments beyond those embodiments specifically described here may be made without departing from the spirit of the invention. Accordingly, such modifications are considered within the scope of the invention as limited solely by the appended claims.

What is claimed is:

1. A modular planting system comprising:
    an outer planter box having at least one side and being completely open at a top and open at a bottom of the outer planter box; and
    an inner planter box having a shape in cross section that is the same as the outer planter box and having at least one side and a porous bottom and being completely open at a top of the inner planter box, the inner planter box being sized to fit within, and being centered within, the outer planter box such that when the inner planter box is inserted within the outer planter box, a top edge of the at least one side of the inner planter box is at least at a same height as a top edge of the at least one side of the outer planter box; and
    a lock top consisting of a body sized to fit only on the top edge of the outer planter box and extending a full length of the top edge, the lock top having an opening to permit the inner planter box to pass through it such that the opening does not obstruct the completely open top of the outer planter box;
    wherein the outer planter, inner planter box and locktop comprise a first module of the modular planting system.

2. The modular planting system of claim 1 wherein the at least one side of the inner planter box comprises a plurality of drainage weep holes.

3. The modular planting system of claim 1 further comprising a dome cover to fit over the inner planter box.

4. The modular planting system of claim 1 further comprising a flat cover to fit over the outer planter box.

5. The modular planting system of claim 1 wherein the top edge of the outer planter box has a plurality of apertures.

6. The modular planting system of claim 5 wherein a top edge of the lock top has a plurality of apertures which are aligned with the plurality of apertures of the outer planter box.

7. The modular planting system of claim 5 further comprising an irrigation system having a plurality of projections, the plurality of projections sized to fit in a matching number of plurality of apertures in the top edge of the outer planter box.

8. The modular planting system of claim 5 further comprising a lighting system having a plurality of projections, the plurality of projections sized to fit in a matching number of plurality of apertures in the top edge of the outer planter box.

9. The modular planting system of claim 8 wherein the lock top further comprising a plurality of channels having wiring therein to intersect with the plurality of apertures in the lock top.

10. The modular planting system of claim 1 wherein the lock top further comprising a plurality of apertures and a lighting system having a plurality of projections, the plurality of projections sized to fit in a matching number of plurality of apertures in the lock top.

11. The modular planting system of claim 1 wherein the outer planter box further comprising a groove in the top edge and a tab extending from a bottom edge of the at least one side of the outer planter box and further comprising a second outer planter box having a groove in the top edge and a tab extending from a bottom edge of the at least one side of the second outer planter box such that the tab of the outer planter box fits within the groove of the second outer planter box so that the first module is stacked upon the second outer planter box and the first module and second outer planter box are held in a stacked position by the tab of the outer planter box and the groove of the second outer planter box.

12. The modular planting system of claim 1 further comprising a coupling to join the first module to a second module.

13. The modular planting system of claim 1 wherein the outer planter box is at least 50% open at the bottom.

14. A modular planting system comprising:
- an outer planter box having at least one side and being completely open at a top and open at a bottom of the outer planter box wherein the outer planter box is at least 50% open at the bottom;
- an inner planter box having a shape in cross section that is the same as the outer planter box and having at least one side and a porous bottom and being completely open at a top of the inner planter box, the inner planter box being sized to fit within, and being centered within, the outer planter box such that when the inner planter box is inserted within the outer planter box, a top edge of the at least one side of the inner planter box is at least at a same height as a top edge of the at least one side of the outer planter box; and
- a lock top to fit on the top edge of the outer planter box and extending a full length of the top edge, the lock top having an opening to permit the inner planter box to pass through it, the top edge of the outer planter box having a groove to receive at least part of the lock top and position the lock top in place with respect to the outer planter box;
- wherein the outer planter box, inner planter box and locktop comprise a first module of the modular planting system.

15. The modular planting system of claim 14 wherein the lock top further comprising a plurality of channels having wiring therein to intersect with the plurality of apertures in the lock top.

16. The modular planting system of claim 14 wherein the outer planter box further comprising a tab extending from a bottom edge of the at least one side of the outer planter box and further comprising a second outer planter box having a groove in a top edge and a tab extending from a bottom edge of the at least one side of the second outer planter box such that the tab of the outer planter box fits within the groove of the second outer planter box so that the first module is stacked upon the second outer planter box and the first module and second outer planter box are held in a stacked position by the tab of the outer planter box and the groove of the second outer planter box.

17. A modular planting system comprising:
- an outer planter box having at least one side and being completely open at a top and open at a bottom of the outer planter box, the bottom of the outer planter box being directly opposite to the top of the outer planter box; and
- an inner planter box having at least one side and a porous bottom and being completely open at a top of the inner planter box, the inner planter box being sized to fit within the outer planter box such that when the inner planter box is inserted within the outer planter box, a top edge of the at least one side of the inner planter box is at least at a same height as a top edge of the at least one side of the outer planter box; and
- a lock top consisting of a body sized to fit only on the top edge of the outer planter box and extending a full length of the top edge, the lock top having an opening to permit the inner planter box to pass through it such that the opening does not obstruct the completely open top of the outer planter box;
- wherein the outer planter box, inner planter box and lock top comprise a first module of the modular planting system.

18. The modular planting system of claim 17, wherein the inner planter box having a shape in cross section that is the same as the outer planter box and being centered within the outer planter box.

\* \* \* \* \*